US008784661B2

(12) United States Patent
McAlister

(10) Patent No.: US 8,784,661 B2
(45) Date of Patent: Jul. 22, 2014

(54) LIQUID FUEL FOR ISOLATING WASTE MATERIAL AND STORING ENERGY

(75) Inventor: Roy Edward McAlister, Phoenix, AZ (US)

(73) Assignee: McAllister Technologies, LLC, Phoenix, AZ (US)

(*) Notice: Subject to any disclaimer, the term of this patent is extended or adjusted under 35 U.S.C. 154(b) by 0 days.

(21) Appl. No.: 13/542,610

(22) Filed: Jul. 5, 2012

(65) Prior Publication Data

US 2013/0036670 A1  Feb. 14, 2013

Related U.S. Application Data

(63) Continuation-in-part of application No. 13/311,434, filed on Dec. 5, 2011, which is a continuation of application No. 13/027,197, filed on Feb. 14, 2011, now Pat. No. 8,070,835.

(60) Provisional application No. 61/523,267, filed on Aug. 12, 2011, provisional application No. 61/421,189, filed on Dec. 8, 2010, provisional application No. 61/304,403, filed on Feb. 13, 2010.

(51) Int. Cl.
*C10L 1/182* (2006.01)

(52) U.S. Cl.
USPC ........... 210/634; 210/660; 210/661; 210/666; 210/669; 435/162; 435/262; 44/300; 44/301; 44/302

(58) Field of Classification Search
USPC .......................................................... 585/15
See application file for complete search history.

(56) References Cited

U.S. PATENT DOCUMENTS

| 4,367,206 | A | * | 1/1983 | Pinto | 423/359 |
| 4,424,118 | A | * | 1/1984 | Rankel | 208/211 |
| 4,861,360 | A | | 8/1989 | Apffel | |
| 4,906,302 | A | * | 3/1990 | Bruya | 134/10 |
| 5,059,303 | A | * | 10/1991 | Taylor et al. | 208/96 |
| 6,180,396 | B1 | | 1/2001 | Ono et al. | |

(Continued)

FOREIGN PATENT DOCUMENTS

| CN | 1918068 A | 2/2007 |
| CN | 101448979 A | 6/2009 |

(Continued)

OTHER PUBLICATIONS

International Search Report and Written Opinion for Application No. PCT/US2012/050656 Applicant: McAlister Technologies, LLC; Date of Mailing Feb. 26, 2013 (10 pages).

(Continued)

*Primary Examiner* — Brian McCaig
(74) *Attorney, Agent, or Firm* — Perkins Coie LLP

(57) ABSTRACT

Techniques, systems, apparatus, and materials are disclosed for generating multi-purpose liquid fuel for isolating contaminants and storing energy. In one aspect, a method of producing a liquid fuel includes forming a gaseous fuel (e.g., by dissociating biomass waste using waste heat recovered from an external heat source). Carbon dioxide emitted from an industrial process can be harvested and reacted with the gaseous fuel to generate the liquid fuel. A hazardous contaminant can be dissolved in the liquid fuel, with the liquid fuel operating as a solvent or continuous phase for a solution or colloid that isolates the hazardous contaminant from the environment. The hazardous contaminant can include at least one of a carbon donor and a hydrogen donor.

25 Claims, 10 Drawing Sheets

(56) References Cited

U.S. PATENT DOCUMENTS

| | | |
|---|---|---|
| 6,673,742 B2 | 1/2004 | Abdo et al. |
| 6,984,305 B2 | 1/2006 | McAlister |
| 8,070,835 B2 | 12/2011 | McAlister |
| 2003/0196810 A1 | 10/2003 | Vinegar et al. |
| 2007/0137246 A1 | 6/2007 | McKellar et al. |
| 2007/0298478 A1 | 12/2007 | Offerman et al. |
| 2008/0072496 A1 | 3/2008 | Yogev et al. |
| 2009/0286890 A1 | 11/2009 | Joshi et al. |
| 2009/0289227 A1 | 11/2009 | Rising |
| 2009/0318572 A1 | 12/2009 | Sakai et al. |
| 2010/0205856 A1 | 8/2010 | Kubic et al. |

FOREIGN PATENT DOCUMENTS

| | | |
|---|---|---|
| EP | 1002767 A2 | 5/2000 |
| EP | 1219585 A2 | 7/2002 |
| GB | 2086416 | 5/1982 |
| JP | 2000-140621 | 5/2000 |
| JP | 2002-193858 | 7/2002 |
| JP | 2003-510403 | 3/2003 |
| JP | 2005-075925 | 3/2005 |
| JP | 2005-289856 | 10/2005 |
| JP | 2008-537956 | 10/2008 |
| JP | 2009-242248 | 10/2009 |
| WO | WO2004/092055 | 10/2004 |
| WO | WO2005-033250 | 4/2005 |
| WO | WO2010078035 A2 | 7/2010 |

OTHER PUBLICATIONS

Dolan, Eric "Device uses sunlight to make liquid fuel". *The Raw Story*. Published: Dec. 24, 2010. 3 pages.

Lee et al.. "Biological Hydrogen Production: Prospects and Challenges". *Trends in Biotechnology* 28.5. Jan. 2010. 10 pages.

Deluga et al.. "AviationBioguels: Hydrotreated Renewable Jet," *General Electric*. Presentation Dated: Feb. 23, 2010. 13 pages.

International Search Report and Written Opinion for Application No. PCT/US2011/24812 Applicant: McAlister Technologies, LLC.; Date of Mailing: Oct. 26, 2011 (12 pages).

International Search Report and Written Opinion for Application No. PCT/US2011/024799 Applicant: McAlister Technologies, LLC.; Date of Mailing: Oct. 18, 2011 (9 pages).

Lopez et al., "Performance of the Southern California Edison Company Stirling Dish," Contractor Report, Prepared by Sandia National Laboratories Albuquerque, New Mexico, California, Printed Oct. 1993, 213 pages.

\* cited by examiner

LIQUID FUEL FOR ISOLATING WASTE MATERIAL AND STORING ENERGY

CROSS-REFERENCE TO RELATED APPLICATIONS

This application is a continuation-in-part of U.S. patent application Ser. No. 13/311,434, filed on Dec. 5, 2011, now pending, which is a continuation of U.S. patent application Ser. No. 13/027,197, filed Feb. 14, 2011, now issued as U.S. Pat. No. 8,070,835, which claims the benefit of U.S. Provisional Patent Application Ser. No. 61/304,403, filed Feb. 13, 2010, now expired, and U.S. Provisional Patent Application Ser. No. 61/421,189, filed Dec. 8, 2010, now expired; in addition, this application claims the benefit of U.S. Provisional Patent Application Ser. No. 61/523,267, filed Aug. 12, 2011, now expired. Each of the foregoing applications is incorporated herein by reference in its entirety.

BACKGROUND

This application relates to devices, techniques, and materials for forming fuels and isolating waste material (e.g., hazardous contaminants) in fuels.

The Industrial Revolution has produced the infrastructure, mechanized equipment, appliances, and communications systems to stimulate civilization's 7 billion people to burn more than one million years' worth of fossil coal, oil, natural gas, and shale accumulations each year. In addition, the global-scale participation in the Industrial Revolution has produced interrelated problems of finite resource depletion and economic inflation, loss of productivity due to diseases that are initiated or exacerbated by air, water, and soil pollution, lack of confidence to adopt the work ethic required for long-term achievements, and global warming that threatens to trigger more severe climate changes by releasing methane and other greenhouse gases from previously frozen soils, melting ice packs, and anaerobic processes in sediments on ocean floors, rivers, lakes, and riparian areas.

SUMMARY

Techniques, structures, apparatus, and materials are disclosed for generating liquid fuels that are storable and transportable. Also, the liquid fuels can be used as solvents or continuous phases for isolating and removing waste materials, such as hazardous waste materials.

In one aspect, a method of producing a liquid fuel for isolating a waste material, such as a hazardous contaminant, from an environment and storing energy includes providing or forming a liquid fuel. For example, forming a liquid fuel can include first dissociating biomass waste using an anaerobic reaction to produce at least one of a hydrocarbon and an alcohol. This reaction can use waste heat recovered from an external heat source. A hydrocarbon from biomass can be dissociated to generate carbon and hydrogen. An alcohol from biomass can be used as the liquid fuel or similarly dissociated. Carbon dioxide emitted from an industrial process can be harvested. The harvested carbon dioxide can be reacted with gaseous fuel (e.g., from biomass waste dissociation) to generate the liquid fuel. A waste material, such as a hazardous contaminant, can be incorporated into the liquid fuel, with the liquid fuel acting as a solvent or continuous phase. The resulting solution or colloid can isolate the waste material from the environment.

Implementations can optionally include one or more of the following features. The method can include applying to the solution or colloid, waste heat recovered from an external heat source to generate a gaseous fuel with a ratio of hydrogen to carbon that is higher than that of the solution or colloid. The method can include dissociating the liquid fuel of the solution or colloid in the presence of waste heat recovered from an external heat source to produce hydrogen and carbon monoxide. The liquid fuel can include an alcohol (e.g., methanol) or ammonia. The method can include transporting the solution or colloid to a remote location before applying waste heat recovered from the external heat source to produce hydrogen and carbon monoxide. Dissociating biomass waste can include producing hydrogen. Dissociating the biomass waste can include producing one or more carbon donors in addition to hydrogen. The method can include reacting the one or more carbon donors with hydrogen to generate alcohol. The method also can include reacting the one or more carbon donors with water to generate alcohol.

The hazardous contaminant can include at least one of a colloidal carbon, a fat, a carbohydrate, a sugar, rejected waste material from a polymer plant, carbon dioxide from exhaust of an industrial process, dust from coal, dust from grain, dust from polymer processing, and distilled solids from an ethanol plant waste stream. The method can include separating at least one of a halogen and a carcinogen from the contaminants prior to combining the contaminants with the liquid fuel. Biomass waste dissociation can produce wet alcohol that can be used as the liquid fuel to be combined with the hazardous contaminant to generate a solution or colloid that isolates the hazardous contaminant from the environment. The hazardous contaminant can include at least one of a carbon donor, a nitrogen donor, and a hydrogen donor. The liquid fuel can be produced, for example, by reacting hydrogen with one or more carbon donors. The liquid fuel also can be produced by reacting one or more carbon donors with water.

The subject matter described in this specification potentially can provide one or more of the following advantages. Hydrogen (e.g., from the dissociation of biomass) can be repurposed along with carbon donors (e.g., carbon dioxide and carbon monoxide) from industrial pollution to create liquid fuel. In addition, the liquid fuel can be used as a solvent or continuous phase for dissolving dangerous contaminants to generate a solution or colloid, which also can be a precursor to renewable fuel. By combining the contaminants in the liquid fuel, the harmful effects of the contaminants can be isolated from the environment.

BRIEF DESCRIPTION OF THE DRAWINGS

Like reference symbols and designations in the various drawings indicate like elements.

DETAILED DESCRIPTION

Figure 1:
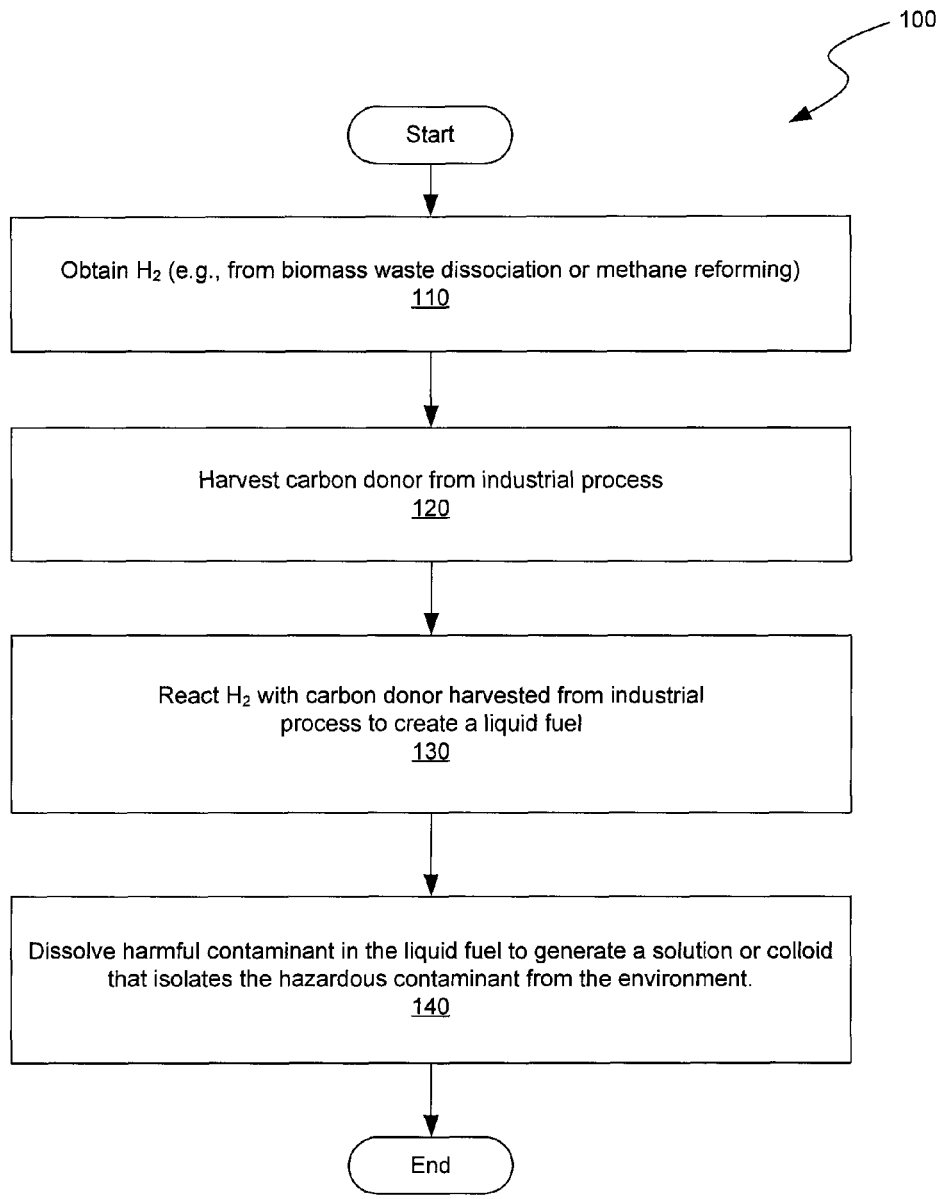
FIG. 1 is a process flow diagram showing an exemplary process for generating liquid fuel from hydrogen and a recycled carbon donor.

Throughout this disclosure, the singular terms "a," "an," and "the" include plural referents unless the context clearly indicates otherwise. Similarly, the word "or" is intended to include "and" unless the context clearly indicates otherwise.

Techniques, structures, apparatus and materials are disclosed for generating liquid fuels that are storable, transportable, and consumable as renewable fuels. Also, the liquid fuels can be used as solvents or continuous phases for isolating and removing hazardous contaminants.

Forming Liquid Fuels for Isolating and Removing Contaminants

Liquid fuels used in embodiments of the present technology can be provided or formed. For example, liquid fuels can be provided by removing them from a storage structure. Liquid fuels can be formed from precursors, such as natural gas and gaseous fuels from biomass dissociation. For example, methane from natural gas or biomass dissociation can be reformed to produce hydrogen, which can be used to form liquid fuels, such as methanol. Biomass waste feedstock (e.g., lignin and cellulose) can be dissociated to produce a mixture of useful renewable materials, such as hydrocarbons, alcohols, ammonia, hydrogen, and oxides of carbon. U.S. application Ser. No. 13/027,068, filed Feb. 14, 2011 describes several exemplary techniques and systems for biomass waste dissociation. Briefly, Equation 1 below shows an example process for biomass waste dissociation.

$$C_xH_yO_z + HEAT \rightarrow CH_4 + H_2 + CO_2 + CO \quad (1)$$

Using the process described in Equation 1, virtually any organic material can be converted in large part to fuel, such as methane ($CH_4$), for distribution and storage in the existing natural gas infrastructure. Equation 2 below illustrates a general summary of the overall reactions for the production of methane from typical biomass wastes such as glucose, lignin, and cellulosic feedstocks.

$$C_6H_{12}O_6 + HEAT \rightarrow 3CH_4 + 3CO_2 \quad (2)$$

In some implementations, the biomass dissociation reaction can produce an alcohol, such as methanol, as a readily storable and transportable liquid fuel and chemical precursor. Methanol or "wood alcohol" can be extracted by heating lignocellulosic wastes through partial combustion or by anaerobic heating processes. Equations 3 and 4 summarize the output of methanol that can be achieved by selecting different anaerobic operating temperatures, pressures, and catalysts.

$$C_6H_{12}O_6 + HEAT \rightarrow 6CO + 6H_2 \quad (3)$$

$$6CO + 6H_2 \rightarrow 3CH_3OH + 3CO \quad (4)$$

At higher feed rates and/or lower heat release rates in a reactor, the charge does not reach the higher temperatures that produce the gases shown in Equation 1, and thus the dissociation process produces alcohol, such as methanol. Carbon monoxide can be separated from methanol by cooling the methanol vapors to form liquid methanol. The separated carbon monoxide can be used to fuel an engine, release heat through combustion by using a burner assembly, and/or form hydrogen by reacting the carbon monoxide with water as summarized in Equation 5. The hydrogen produced during the reaction summarized in Equation 5 can be used to produce methanol as shown in Equation 4, to improve the operation of an engine, to improve the yield of methane and/or ethane in biomass conversion and/or as a heating fuel.

$$CO + H_2O \rightarrow H_2 + CO_2 \quad (5)$$

The hydrocarbons and alcohols produced from biomass waste dissociation can be further dissociated to generate carbon and hydrogen. Equation 6 illustrates a general process of dissociating hydrocarbon fuel to obtain hydrogen and carbon. Equation 7 shows a specific reaction for the dissociation of methane into carbon and hydrogen.

$$C_xH_y + HEAT \rightarrow XC + 0.5YH_2 \quad (6)$$

$$CH_4 + \Delta H_{298K} \rightarrow 2H_2C \; (\Delta H_{298K} = 79.4 \text{ kJ/mol}) \quad (7)$$

Equation 8 shows a reaction for dissociating ethanol by anaerobic decomposition to obtain carbon, carbon monoxide, and hydrogen. A similar reaction can be used to dissociate other fuel alcohols.

$$C_2H_5OH + HEAT \rightarrow C + CO + 3H_2 \quad (8)$$

The generated carbon can be used in the production of carbon-based durable goods, such as materials that can be used to produce various equipment used in wind power generation, solar power generation, etc.

The hydrogen collected from dissociating alcohols, such as methanol, and hydrocarbons, such as methane, can be used to produce a liquid fuel with multiple applications. In one aspect, a liquid fuel can be generated by reacting $H_2$ with a carbon donor, such as $CO_2$ or CO that has been harvested and repurposed or recycled from an industrial process (e.g., pollution).

In addition, H2 can be obtained by any other energy-induced dissociations, including the electrolysis of anaerobically developed acids and liquors from organic digestion processes, and from water as generally shown in Equation 9.

$$H2O + ENERGY \rightarrow 0.5O2 + H2 \quad (9)$$

Pressurized hydrogen or pressurized and heated hydrogen such as may be produced by the pressurizing processes shown in Equations 1, 3, 5, and 8 can be used to pressurize a carbon donor in a reaction to form a specifically desired compound, such as DME or methanol.

In another aspect, an energy-dense liquid mixture that reduces vapor pressure or availability of the vapor pressure of a previously hazardous contaminant is produced by a method that includes dissociating biomass waste using an aerobic reaction to produce at least one of hydrocarbon and alcohol by applying waste heat recovered from an external heat source. The at least one of hydrocarbon and alcohol is dissociated to generate carbon and hydrogen. Carbon dioxide emitted from an industrial process is harvested. The harvested carbon dioxide is reacted with the hydrogen to generate the hydrogen-dense intermediary or fuel. A hazardous contaminant is dissolved in the hydrogen-dense fuel operating as a solvent to generate the liquid mixture that isolates the hazardous contaminant from the environment. The hazardous contaminant can include at least one of a carbon donor and a hydrogen donor. The liquid mixture can be produced by the method that includes applying to the liquid mixture, waste heat recovered from the external heat source or another external heat source to generate a renewable fuel mixture with a ratio of hydrogen to carbon that is higher than the hydrocarbon and the alcohol produced from the biomass waste dissociation. The energy-dense liquid mixture can be produced by the method that includes dissociating the hydrogen-dense intermediary in the presence of waste heat recovered from the external heat source or another external heat source to produce high specific energy hydrogen and carbon monoxide. The hydrogen-dense intermediary or fuel can include at least one of hydrocarbon, alcohol and ammonia. The hydrocarbon can include methane, and the alcohol can include methanol. The energy-dense liquid mixture can be produced by the method that further includes transporting the hydrogen-dense intermediary to a remote location before applying waste heat recovered from the external heat source or another external heat source to produce high specific energy hydrogen and carbon monoxide. The energy-dense liquid mixture can be produced by the method that further includes transporting the liquid mixture to a remote location before applying waste heat recovered from the external heat source or another external heat source to produce high specific energy hydrogen and carbon monoxide.

The energy-dense liquid mixture can be produced by the process where dissociating the biomass waste includes producing hydrogen in addition to the hydrocarbon and alcohol. The energy-dense liquid mixture can be produced by the method that includes dissociating the biomass waste, which includes producing one or more carbon donors in addition to the hydrocarbon and alcohol. The energy-dense liquid mixture can be produced by the method that includes reacting the one or more carbon donors with the hydrogen produced from the biomass waste to generate hydrogen-dense alcohol. The energy-dense liquid mixture can be produced by the method that includes reacting the one or more carbon donors with water to generate additional alcohol. The hazardous contaminant can include at least one of colloidal carbon, fat, carbohydrate, sugar, rejected waste material from a polymer plant, carbon dioxide from exhaust of an industrial process, dust from coal, dust from grain, dust from polymer processing, and distilled solids from ethanol plant waste stream. The energy-dense liquid mixture can be produced by a process that includes filtering at least one of a halogen and a carcinogen is filtered out from the contaminants.

FIG. 1 is a process flow diagram showing an exemplary process 100 for generating liquid fuel from $H_2$ and a recycled carbon donor. A system (e.g., system 400 below) can obtain $H_2$, for example, by reforming natural gas or products of biomass waste dissociation (110). A carbon donor, such as $CO_2$ or CO, can be harvested from an industrial process (120). The carbon donor can include $CO_2$ or CO that has been emitted as pollution from central power plants, coking, and calcining operations that burn hydrocarbons or from breweries and bakeries, for example. The $H_2$ can then be reacted with the harvested carbon donor to generate a liquid fuel (130).

Hydrogen from suitable sources, such as the production summarized by Equations 1-9, can be reacted with an oxide of carbon to produce various fuels that can be easily stored, transported, and utilized (e.g., the methanol as illustratively shown in Equations 10 and 11).

(10)

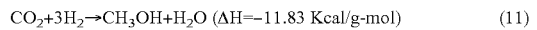

(11)

In some implementations, catalysts can be added to the processes of Equations 10 and 11. These catalysts may include copper-zinc-oxide and deposited sinter mixtures of copper and copper-zinc oxide. Various process synthesis conditions, including a temperature of about 260° C. (500° F.) and a pressure of 1500 psi, can be used to produce methanol or methanol and water as shown. Alternatively, dimethyl ether (DME), ethylene, or propylene can be produced depending upon the pressure, temperature, and catalysts chosen.

The methanol and water solution produced by the process summarized by Equations 10 and 11 can serve as a solvent or continuous phase for waste materials (e.g., soluble organic waste materials) that can also act as hydrogen and/or carbon donors. Soluble organics, for example, can include various harmful contaminants that contain soluble carbon, such as food-processing waste material (e.g., fat, carbohydrates, and sugars), colloidal carbon, reject materials from industrial processes (e.g., reject materials from polymer plants not recycled back into creating polymers), paper processing wastes, grain dust, molasses residues, and various residues of the fossil fuel industry (e.g., coal dust, refinery coke, and tar wastes, etc.), which are depicted as "C" in the process shown in Equation 12.

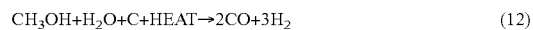

(12)

The liquid fuel can be used as a solvent or continuous phase to be combined with the harmful contaminant to generate a solution or colloid that isolates the hazardous contaminant from the environment (140). The contaminant (e.g., the soluble organic) can improve the production of carbon monoxide (CO) and hydrogen ($H_2$) as described below with respect to FIG. 6. The solution or colloid can be stored and/or transported to a different location before being reacted endothermically to generate a gaseous fuel.

Certain materials (e.g., halogens or carcinogens) present in the contaminants can be filtered out before the contaminants are combined with the liquid fuel. For example, halogens or carcinogens can be reacted with another compound in the contaminants. Certain halogens can react with compounds in exhaust fumes to create salts, such as NaCl. Any sulfur oxides present can be filtered out by precipitating them with calcium to generate calcium sulfate, for example. Sulfur can be reacted with iron to generate iron sulfide, which can be used as a nutrient for plants.

Figure 2:
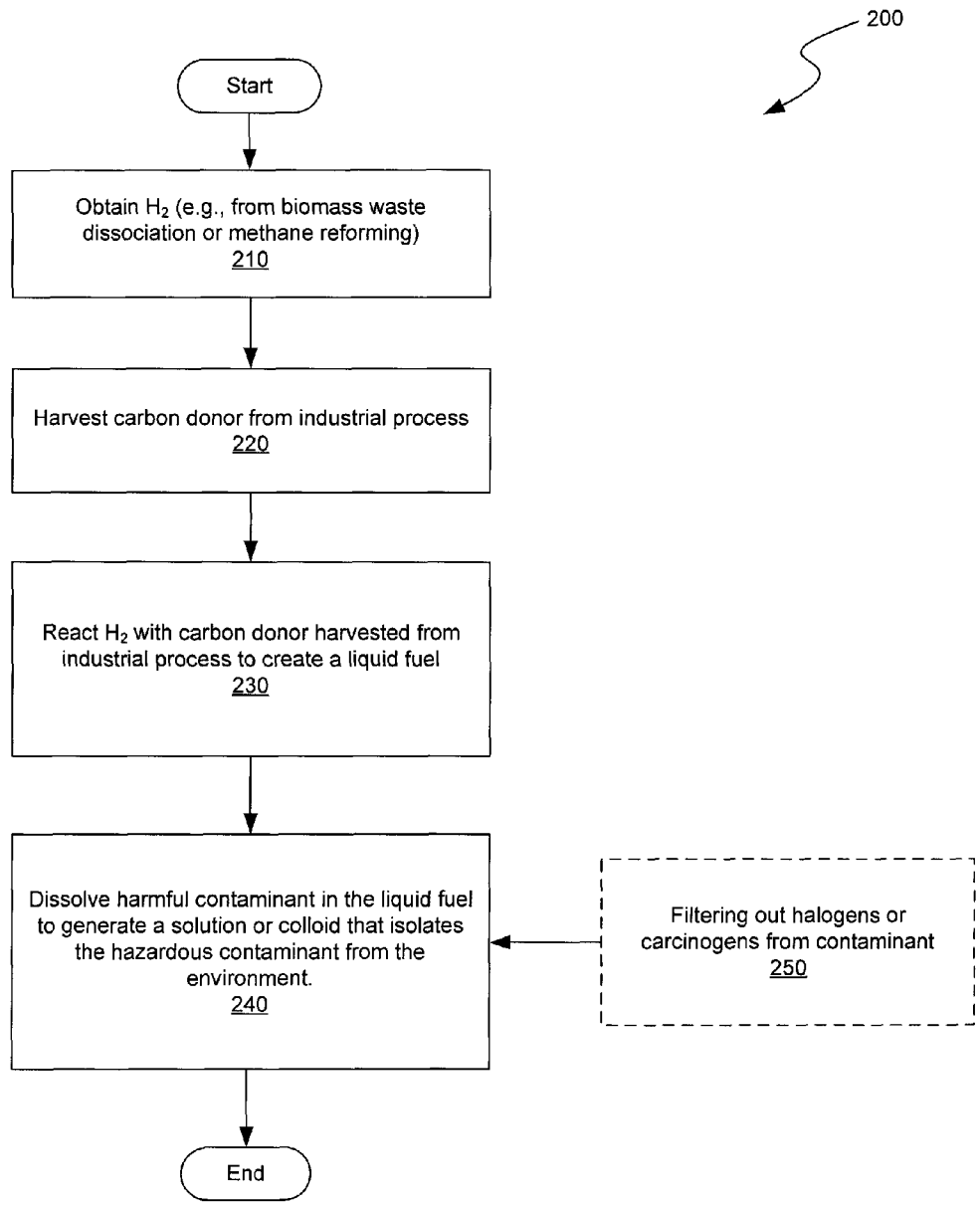
FIG. 2 is a process flow diagram of a process for isolating harmful contaminants using a liquid fuel.

FIG. 2 is a process flow diagram for another process 200 for isolating harmful contaminants using a liquid fuel. The process 200 is similar to the process 100 except that process 200 includes a step for filtering out the halogens and carcinogens from the liquid fuel (see step 250). Specifically, a system (e.g., system 500 below) can obtain $H_2$ (e.g., by reforming products of biomass waste dissociation (210)). Also, the system can harvest a carbon donor, such as $CO_2$ or CO from an industrial process (220). The harvested carbon donor can include $CO_2$ or CO emitted as pollution from central power plants, coking, and calcining operations that burn hydrocarbons or from breweries and bakeries, for example. The $H_2$ can be reacted with the harvested carbon donor to generate a liquid fuel. As shown in Equation 12, the liquid fuel can be used as a solvent or continuous phase for the harmful contaminant in order to generate a solution or colloid that isolates the hazardous contaminant from the environment (240). The system can then filter out the halogens and carcinogens from the hazardous contaminant using the above described techniques (250).

In several embodiments of the present technology, the described techniques, apparatus, and systems readily accept fuel solutions including water and/or oxygenated constituents. Eliminating water and/or oxygenated constituents, therefore, can be unnecessary, which can reduce fuel production cost by eliminating the need for equipment and energy that are associated with producing and storing fuels free of water and/or oxygenated constituents. Also, the described techniques can reduce fuel toxicity by decreasing or eliminating concentration gradients between water solutions within living cells and fuel solutions. Moreover, the described techniques can facilitate the beneficial thermochemical regeneration of energetic fuels, as summarized in Equation 12. As described above, carbon can be delivered and donated from liquid fuel constituents, such as methanol, which can act as vehicles to safely and gainfully dispose of objectionable or waste substances such as grain dust, coal dust, polymer fumes, tire dust, diesel soot, paint fumes, cutting fluids, and cooking fumes.

Figure 3:
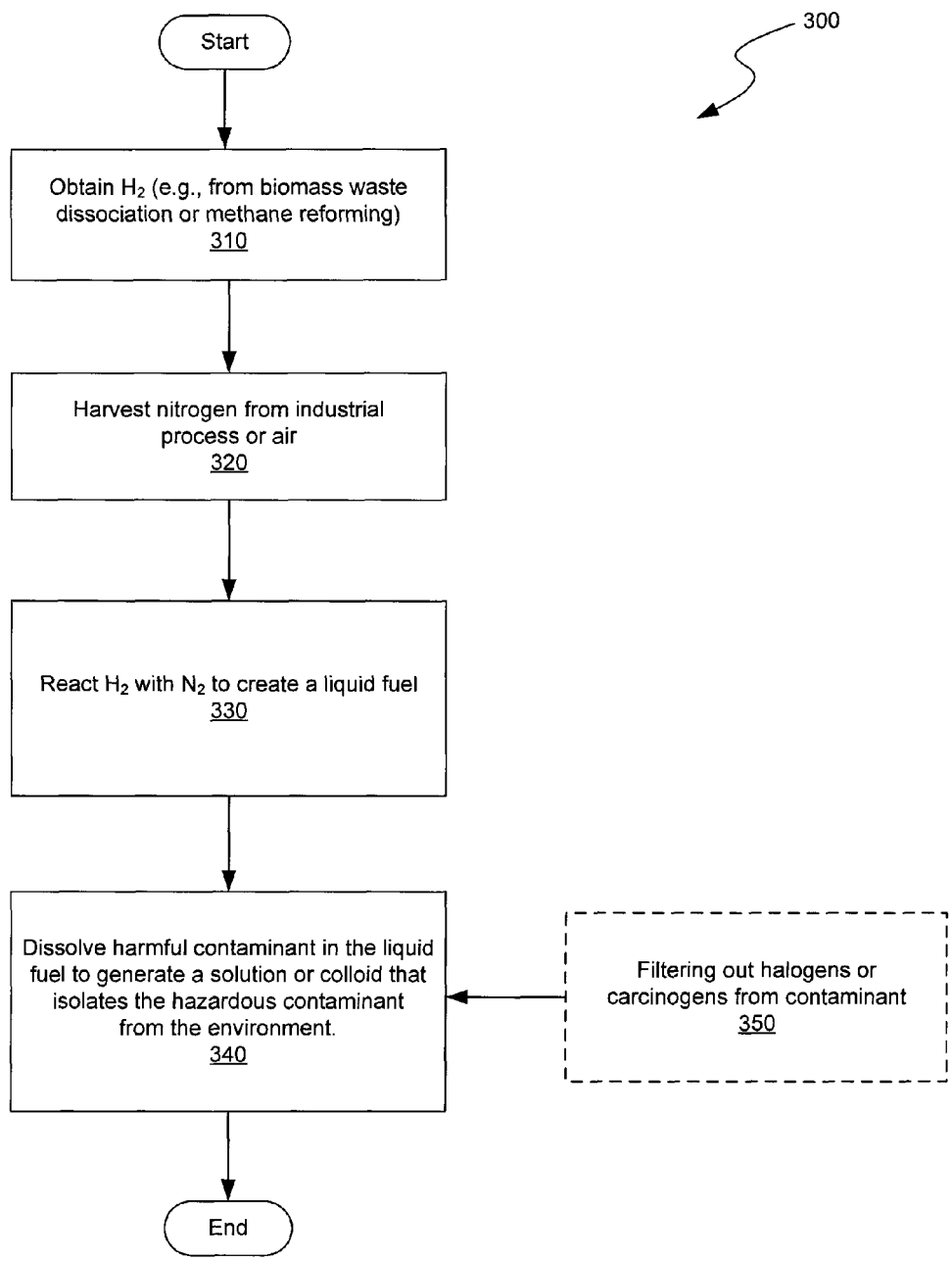
FIG. 3 is a process flow diagram of an exemplary process for repurposing nitrogen from air or a waste product to generate liquid fuel that can isolate and remove hazardous contaminants.

Nitrogen from the air or from pollutants can be used to generate ammonia ($NH_3$). FIG. 3 shows a process flow diagram for an exemplary process 300 for repurposing nitrogen from air or waste products to generate liquid fuel that can isolate and remove hazardous contaminants. A system (e.g., system 400 below) can obtain $H_2$ (e.g., by reforming products of biomass waste dissociation (310)). Also, the system can harvest nitrogen from an industrial process or the air (320). The harvested nitrogen can be part of the emitted pollution from central power plants, coking, and calcining operations that burn hydrocarbons or from breweries and bakeries, for example. The $H_2$ can be reacted with the harvested nitrogen to generate a liquid fuel (330). Similar to Equation 12, ammonia can be used as a solvent or continuous phase to combine with a harmful contaminant in order to generate a solution or colloid that isolates the hazardous contaminant from the environment (340). In some implementations, the system can filter out the halogens and carcinogens from the hazardous contaminant using the above described techniques (350).

Repurposing or recycling oxides of carbon such as carbon dioxide or carbon monoxide from air-burning processes generally poses the problem of separation or accommodation of nitrogen contamination. Another process variation for the preparation of value from mixtures of reactive ionic species is provided by arc, corona, microwave, or radiative ionization. Mixtures of carbon monoxide, hydrogen (e.g., hydrogen produced by the processes described in Equation 6 or 7), and nitrogen can be reacted to produce $CH_3OH$ and $NH_3$ as shown in Equation 13.

$$CO+5H_2+N_2+ENERGY \rightarrow CH_3OH+2NH_3 \qquad (13)$$

Also, nitrogen separated from the exhaust of an engine can be used as a cover gas for autoclave processing. Separated nitrogen can be reacted with hydrogen to form ammonia or a variety of compounds. In addition, various "nitrogen fixing" processes include synthesizing of ammonia from nitrogen and pressurizing hydrogen for use in the synthesis of methanol. Equation 14 shows a process of ammonia formation.

$$3H_2+N_2 \rightarrow 2NH_3 \qquad (14)$$

Other sources of nitrogen can include power plants that use air to combust natural gas (NG) in Rankine cycle and combined cycles (e.g., combustion turbines sourcing heat for steam turbines), which have about 3-6% $CO_2$ in flue emissions. The balance of the flue emissions can be nitrogen, water vapor, and lower concentrations of various greenhouse gases as shown in Equation 15.

$$CH_4+Air\ (0.8N_2+0.2O_2) \rightarrow N_2+CO_2+H_2O \qquad (15)$$

Coal fired Rankine-cycle power plants can have about 10-12% $CO_2$ in flue emissions in addition to nitrogen. Equation 16 summarizes an approximate process where air and coal combustion produces nitrogen and $CO_2$.

$$Coal+Air\ (0.8N_2+0.2O_2) \rightarrow N_2+CO_2 \qquad (16)$$

In addition, it is possible to use sulfur in the form of $H_2S$ and other sulfur compounds that are removed from the gas mixture (e.g., exhaust gas from industrial processes) in processes that provide valuable chemicals and fertilizers. For example, ammonium sulfate can be readily produced from such feedstocks using any suitable technology, such as the saturator, Wilputte, pickle liquor, and indirect processes. Oleum and/or sulfuric acid can also be produced from the sulfur in the delivered gas mixture. Similarly, other compounds such as ammonium chloride, ammonium bromide, ammonium iodide, ammonium nitrate, ammonium acetate, ammonium phosphate, and ammonium carbonate can be readily produced to meet market demand for such products.

Ammonia produced by these or other reactions (e.g., reactions that utilize hydrogen produced by the processes described in Equation 6 or 7) can be safely stored and transported. Ammonia can provide compact energy storage and can also serve as a precursor of hydrogen. Ammonia can be stored in various ways including as a pressurized liquid, a salt (e.g., ammonium chloride), or in activated media (e.g. activated carbon). Pressurization can be accomplished, for example, by heat addition. Decomposed ammonia, when used with a catalyst can be utilized to pressurize the $N_2$ and $H_2$ products as well as the carbon monoxide and hydrogen that can be co-produced from methanol or wet methanol.

Small amounts of $NH_3$, $H_2S$, $N_2$, and $H_2O$ also can be found in the gaseous products of biomass dissociation. $H_2S$ can be reacted with iron to form iron sulfide or collected in carbon produced by the process while hydrogen is released. Fixed nitrogen can be collected as ammonia and sulfur as iron sulfide. These substances can be use as soil nutrients along with any ash that is collected.

Figure 4A:
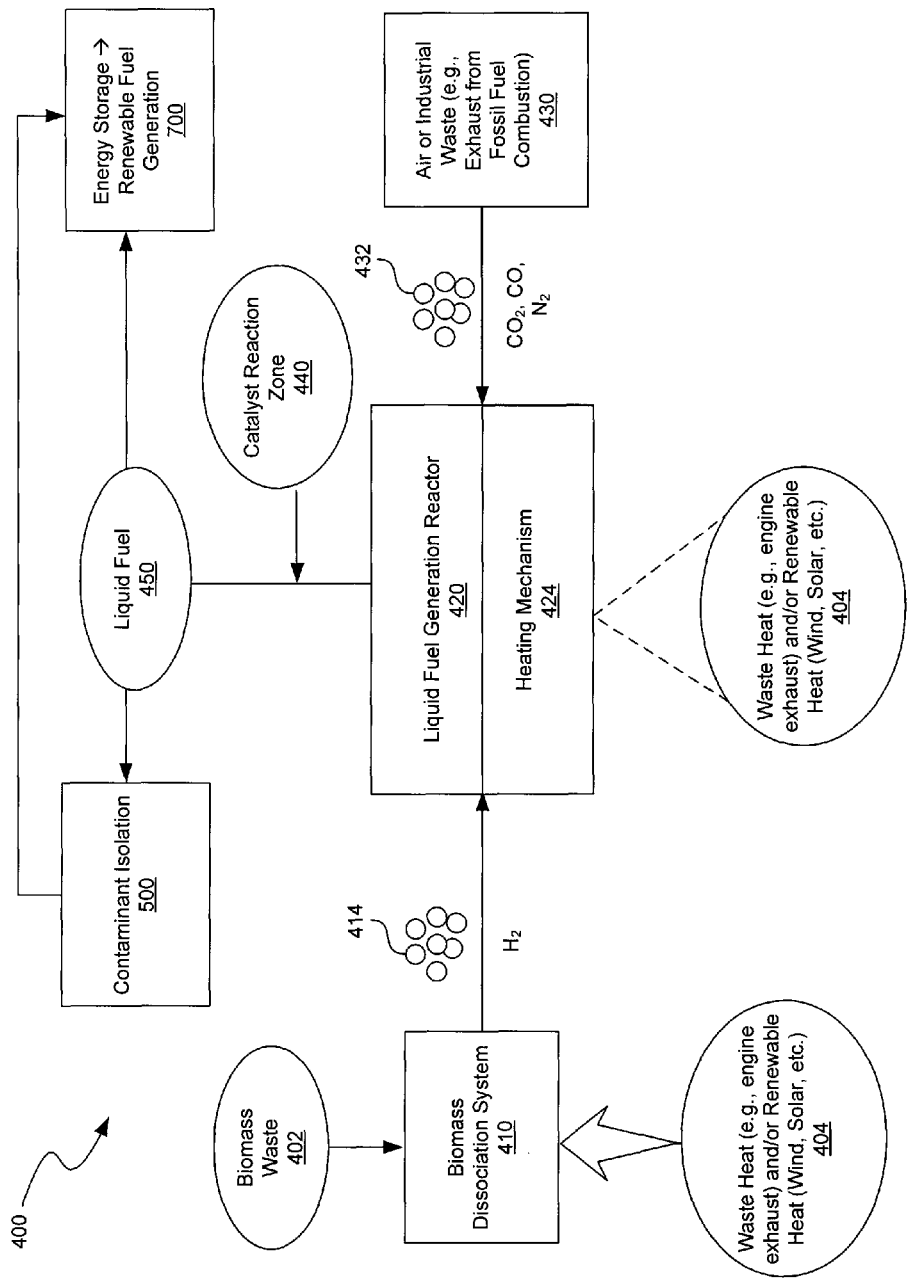
FIG. 4A is a block diagram showing an exemplary system for generating liquid fuel by repurposing or recycling carbon donors and nitrogen donors harvested from air or industrial waste with hydrogen generated from biomass dissociation.

FIG. 4A is a block diagram showing an exemplary system 400 for generating liquid fuel by repurposing or recycling carbon donors and hydrogen donors harvested from industrial waste with hydrogen (e.g., hydrogen generated from reforming products of biomass dissociation). The system 400 includes a biomass dissociation system 410 that receives biomass waste 402 to be dissociated into carbon, hydrocarbons, alcohols, ammonia, and hydrogen using a thermochemical regenerative process. The heat used to dissociate the biomass waste 402 can include waste heat 404 from engine exhaust, engine cooling systems, etc., that would otherwise be released to the environment. Also, one or more renewable energy sources, such as wind, solar, etc., can be used to generate the heat.

From the biomass dissociation system 410, hydrogen 414 (from the dissociation of hydrocarbons, for example) is captured and forwarded to liquid fuel generator 420, which includes a heating mechanism 424. The liquid fuel generator 420 also receives carbon donors, hydrogen donors, nitrogen, or any combination of the three 432 that were harvested from industrial processes (e.g., as exhaust gases from fossil fuel combustion or the air). In the liquid fuel generator 420, the $H_2$ reacts with the harvested carbon donors, hydrogen donors, nitrogen, or any combination of the three 432 to generate liquid fuel 450, such as methanol. The harvested carbon donors, hydrogen donors, nitrogen, or any combination of the three 432 can be obtained from the air or industrial waste (e.g., exhaust from fossil fuel combustion) 430.

The system 400 can include a catalyst reaction zone 440 to receive one or more catalysts that can enhance the generation of the liquid fuel. Examples of catalysts are describe above.

The generated liquid fuel 450 can be storable and transportable. For example, the liquid fuel 450 can operate as a vehicle for carrying energy to a desired destination. The liquid fuel 450 also can be dissociated to obtain $H_2$ using a renewable fuel generation system 700.

The liquid fuel 450 can be sent to a contaminant isolation system 500 so that it can be combined with hazardous contaminants that include carbon donors, hydrogen donors, or both as described above. By combining liquid fuel with the hazardous contaminants, such as $CO_2$, the release of the harmful contaminants into the environment can be prevented or reduced. When the hazardous contaminants are combined with the liquid fuel 450, the resulting solution or colloid can be environmentally safe. Moreover, the solution or colloid, which has isolated and removed the hazardous contaminants, can be dissociated (e.g., by the renewable fuel generation system 700) in order to obtain renewable energy.

Figure 4B:
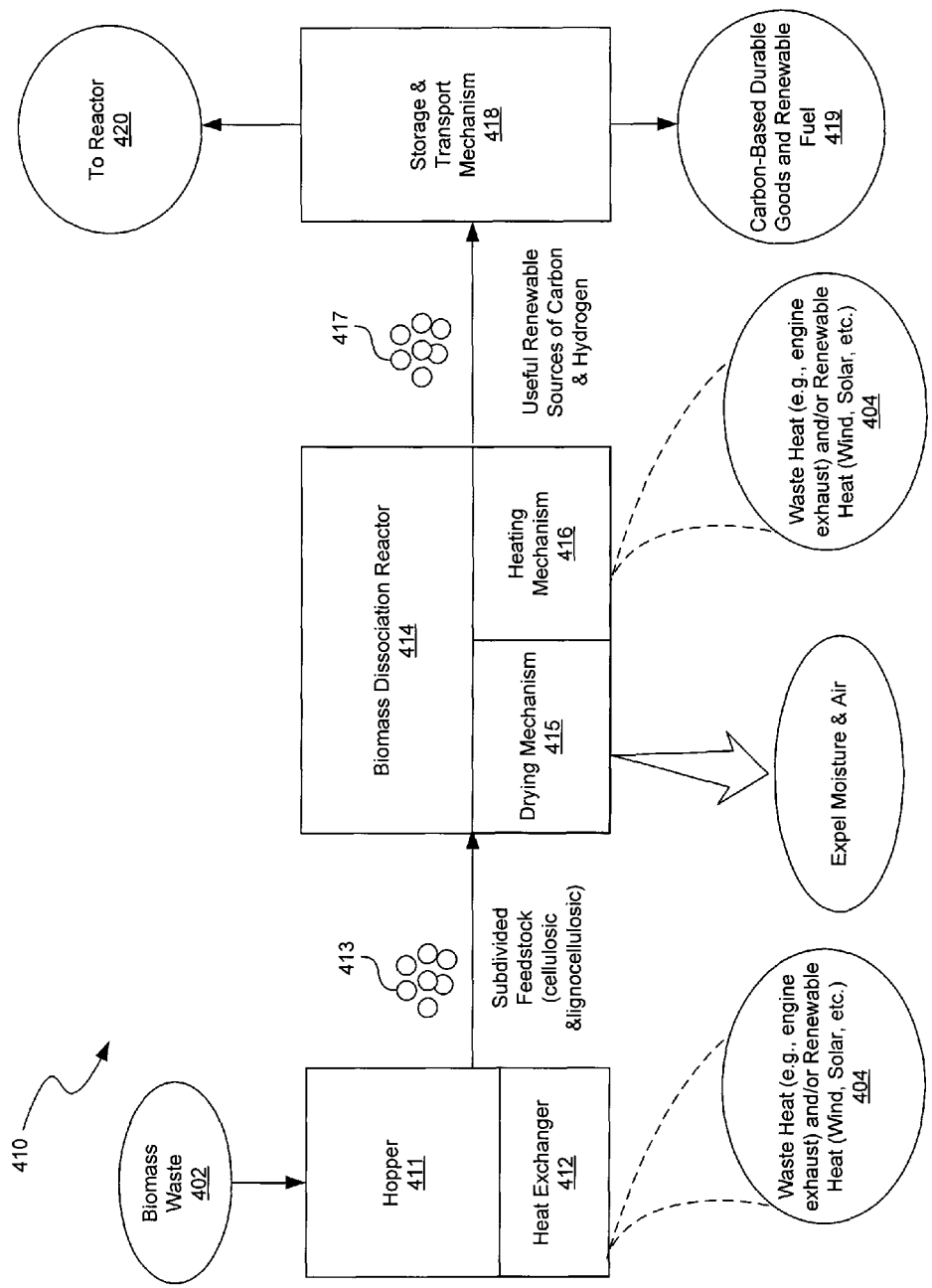
FIG. 4B is a block diagram showing an exemplary system for dissociating biomass waste into hydrogen and carbon carrying intermediaries.

FIG. 4B is a block diagram showing an exemplary system 410 for dissociating biomass waste into hydrogen- and carbon-carrying intermediaries. The system 410 includes a biomass waste intake component, such as a hopper 411, that receives the biomass waste 402 in raw form and breaks the raw material down (e.g., chips, chops, grinds, etc.) into subdivided feedstock, such as various cellulosic and lignocellulosic materials. The hopper 411 can include a heating mechanism, such as a heat exchanger 412 to pre-heat the subdivided feedstock. The heat exchanger can recapture and recycle waste heat 404 from an external heat source (e.g., engine exhaust and/or renewable heat, such as wind, solar, etc.) or from the biomass dissociation reactor 414 itself.

The subdivided (and in some implementations, pre-heated) feedstock 413 can be forwarded to a biomass dissociation reactor 414 to dissociate the biomass waste feedstock into useful renewable sources of carbon and hydrogen, such as various hydrocarbons, alcohols, ammonia, and oxides of carbon. The reactor 414 can include a drying mechanism 415 to expel moisture and air from the feedstock. The drying mechanism 415 can include an extruding device to physically "squeeze out" the moisture and air from the feedstock. Examples of the extruding device include a helical screw conveyer and a ram piston conveyer. Also, the drying mechanism 415 can include one or more heating mechanisms 416, such as heat exchangers that capture the heat generated by the reactor 414 and recycle the captured heat to dry the feedstock. The heat exchangers can also recapture and recycle waste heat 404 from an external heat source (e.g., engine exhaust and/or renewable heat, such as wind, solar, etc.)

The reactor 414 can also include the heating mechanism 416 to generate adequate heat to be used in an anaerobic reaction to dissociate the biomass waste feedstock into the useful renewable sources of carbon and hydrogen 417, such as hydrocarbons, alcohols, ammonia, and oxides of carbon. The generated useful renewable sources of carbon and hydrogen 417 can be forwarded to a storage and/or transport mechanism 418 to be used by the liquid fuel generation reactor 420 and in additional reactions to generate renewable fuel and/or carbon-based durable goods 419 as described in U.S. application Ser. No. 13/027,068, filed Feb. 14, 2011. Moreover, the storage and/or transport mechanism 418 allows for efficient transport of the useful renewable sources of carbon and hydrogen 417 to remote locations for further processing.

The biomass dissociation reactor 414 can be configured to increase the thermal efficiency of the biomass waste conversion process while reducing or eliminating carbon dioxide formation. For example, the biomass dissociation reactor 414 can include mechanisms to perform countercurrent drying (e.g., recycling heat) and to otherwise eliminate air, moisture, and other oxygen donors before extracting the carbon, hydrocarbons, such as methane, and/or hydrogen.

Figure 5:
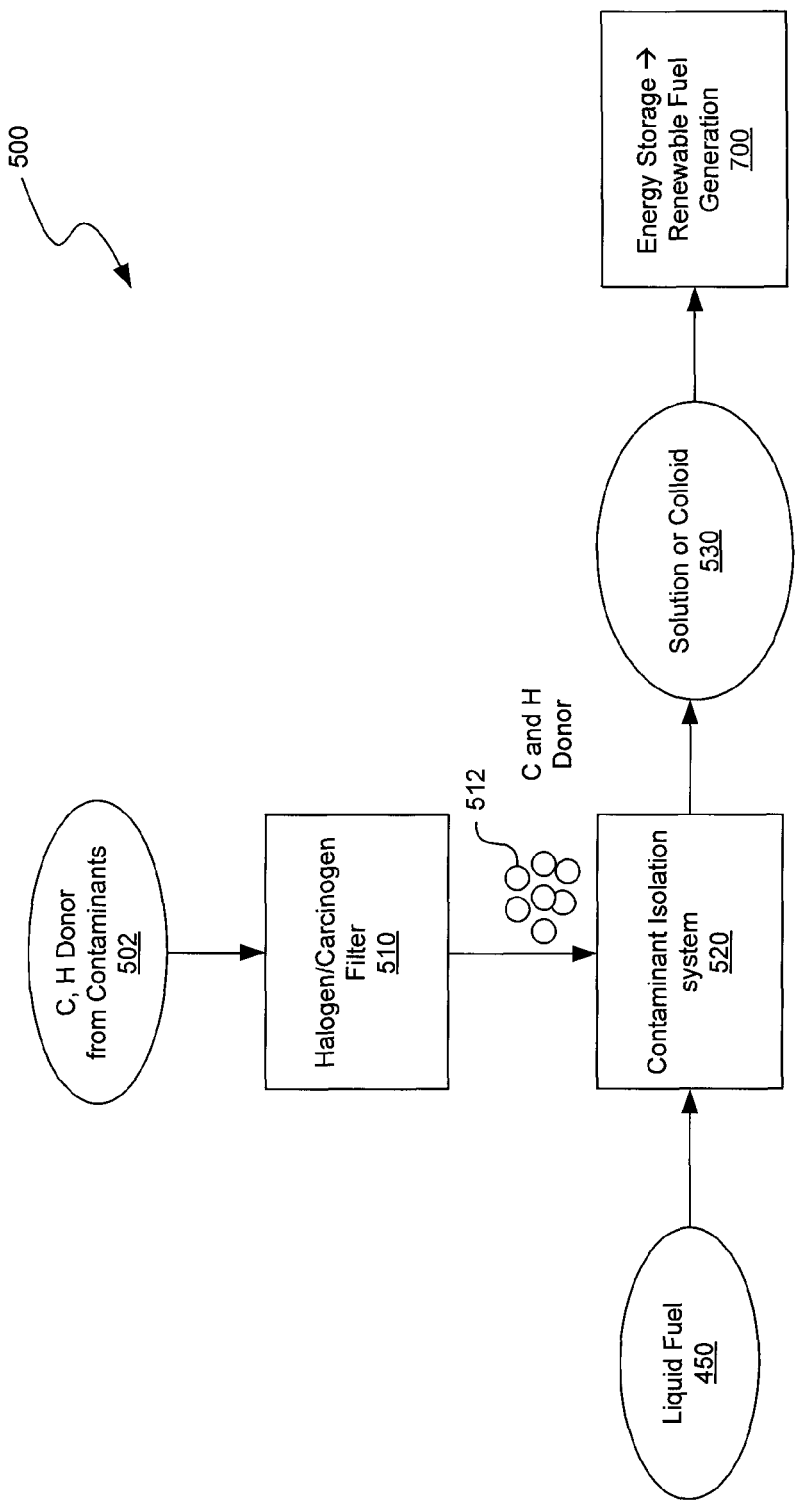
FIG. 5 is a block diagram showing an exemplary system for using the liquid fuel as a solvent to dissolve harmful contami

FIG. 5 is a block diagram showing an exemplary system 500 for using the liquid fuel as a solvent or continuous phase that can be combined with harmful contaminants to obtain a solution or colloid that isolates the elements of the contaminants that are harmful to the environment. The system 500 can receive the liquid fuel 450 along with the hazardous contaminants as described above with respect to Equation 12. The contaminants can include a carbon donor, a hydrogen donor, or both, such as in colloidal carbon. The system 500 can include a contaminant isolation system 520 that dissolves the contaminants in the liquid fuel 450 to generate a solution or colloid 530 that isolates the elements of the contaminants that are harmful to the environment.

The system 500 can include a filter 510 that strips out any halogens or carcinogens from the contaminants 502 prior to providing the carbon donor or carbon and hydrogen donors 512 in the contaminants to the contaminant isolation system 520. Several techniques for filtering out halogens or carcinogens (e.g., as harmless salts, etc.) are described above with respect to FIGS. 2-3. The liquid mixture can be forwarded (e.g., by pipeline transportation) to a storage container or a renewable fuel generating system (e.g., system 700) to generate renewable fuel, such as hydrogen.

Liquid Fuel for Storing Energy

The liquid fuels produced using the processes described in Equations 10 and 11 can provide a bridge technology for increasing the financial return on past investments in equipment. For example, existing transportation engines and storage tanks can be used to perform thermochemical regeneration of such fuels as summarized in Equation 17 to produce fuels that promote longer engine life and greater fuel efficiency along with greatly reduced emissions of carbon dioxide, oxides of nitrogen, and particulates.

$$CH_3OH + HEAT \rightarrow CO + 2H_2 \tag{17}$$

The heat used in the process of Equation 17 can be, for example, waste heat from an engine. Additionally, the heat used in the process of Equation 17 can be generated from renewable resources, such as wind and solar energy generators.

Similarly, the solution or colloid generated by adding a contaminant to a liquid fuel can be dissociated in an endothermic reaction to generate gaseous fuel, such as by using the reaction process of Equation 12.

The economics of producing hydrogen fuel as shown in Equations 12 and 17 are more favorable when compared to burning methane as a fuel, as shown in Equation 18 below.

$$CH_4 + 2O_2 \rightarrow CO_2 + 2H_2O + HEAT \tag{18}$$

For example, the heat produced by the reaction of methane at a constant pressure in Equation 17 is approximately −344,940 BTU/Mole. But for three moles of hydrogen it is 3(−103,968 BTU/Mole)=−311,904 BTU; and 2(−121,666 BTU/Mole)=−243,332 for combusting 2CO in Equation 12 for a total yield of −555,236 BTU. This is without any credit for the heat of condensation of 3 moles of water. Thus, about 60% more combustion energy can be delivered for the production of work by the engine. Thermochemical regeneration does not require the new fuel species to be used at elevated temperature, and the new species can regeneratively transfer heat to the thermochemical process for additional advantages as described herein.

Depending upon the type and concentration of contaminants in the liquid fuel, additional energy (e.g., 25% to 60% more energy) can be delivered to a combustion chamber. The additional energy can be utilized efficiently by a fuel injector (e.g., a fuel injector including multiple stacks of stratified combustants). For example, the solution or colloid can combust more rapidly with fewer particulates and oxides of nitrogen by adaptively controlling the timing of the initial fuel injection and ignition, the timing of each subsequent fuel injection and ignition, and the fuel pressure of each fuel injection.

Hydrogen and hydrogen donors, such as $NH_3$, can be stored in activated carbon and other host substances for later release under conditions that control the degree of allowed expansion to produce the pressure desired. For example, multi-fuel injectors (as described in U.S. Pat. No. 7,628,137) can provide greater volumes of fuel (e.g., fuel that may include considerable amounts of non-fuel constituents). The low-cost pressurization of the process shown in Equation 10 also can be enabled by releasing fuel from absorbed storage and/or by dissociating the fuel (e.g., ammonia as shown in illustrative Equations 19, 20 and 21).

$$2NH_3 \rightarrow 3H_2 + N_2 \tag{19}$$

$$CO + 3H_2 + N_2 \rightarrow CH_3OH + H_2 + N_2 \tag{20}$$

$$CO_2 + 3H_2 + N_2 \rightarrow CH_3OH + H_2O + N_2 \tag{21}$$

Figure 6:
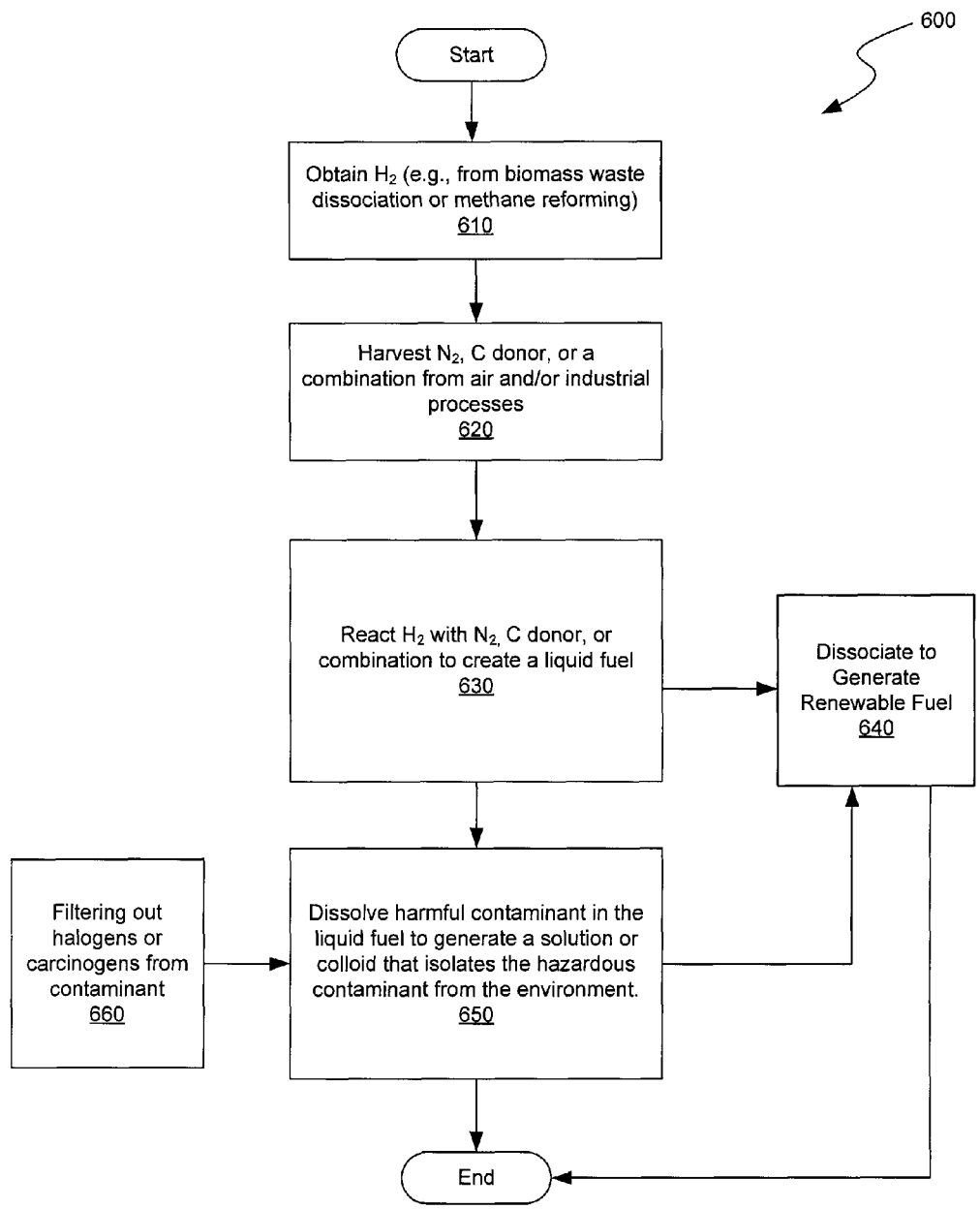
- FIG. 6 is process flow diagram of an exemplary process for generating a multi-purpose liquid fuel for isolating hazardous contaminants and for storing energy as described above.

FIG. 6 is process flow diagram of an exemplary process 600 for generating multi-purpose liquid fuel for isolating hazardous contaminants and storing energy as described above. A system (e.g., system 700 below) can obtain $H_2$, for example, by reforming natural gas or products of biomass waste dissociation (610). The system can harvest $N_2$, carbon donors, hydrogen donors, or a combination of these from industrial processes (620). The system can then react the $H_2$ with the $N_2$, carbon donor, hydrogen donor, or combination of these harvested from the industrial processes to create a liquid fuel (630). The liquid fuel can be dissociated under endothermic reaction conditions (e.g., by applying appropriate heat) to generate gaseous fuel (640).

The system can use the liquid fuel as a solvent or continuous phase to be combined with harmful contaminants to generate a solution or colloid that isolates the hazardous contaminant from the environment (650). The system can filter out any halogens or carcinogens from the contaminants (660).

Figure 7:
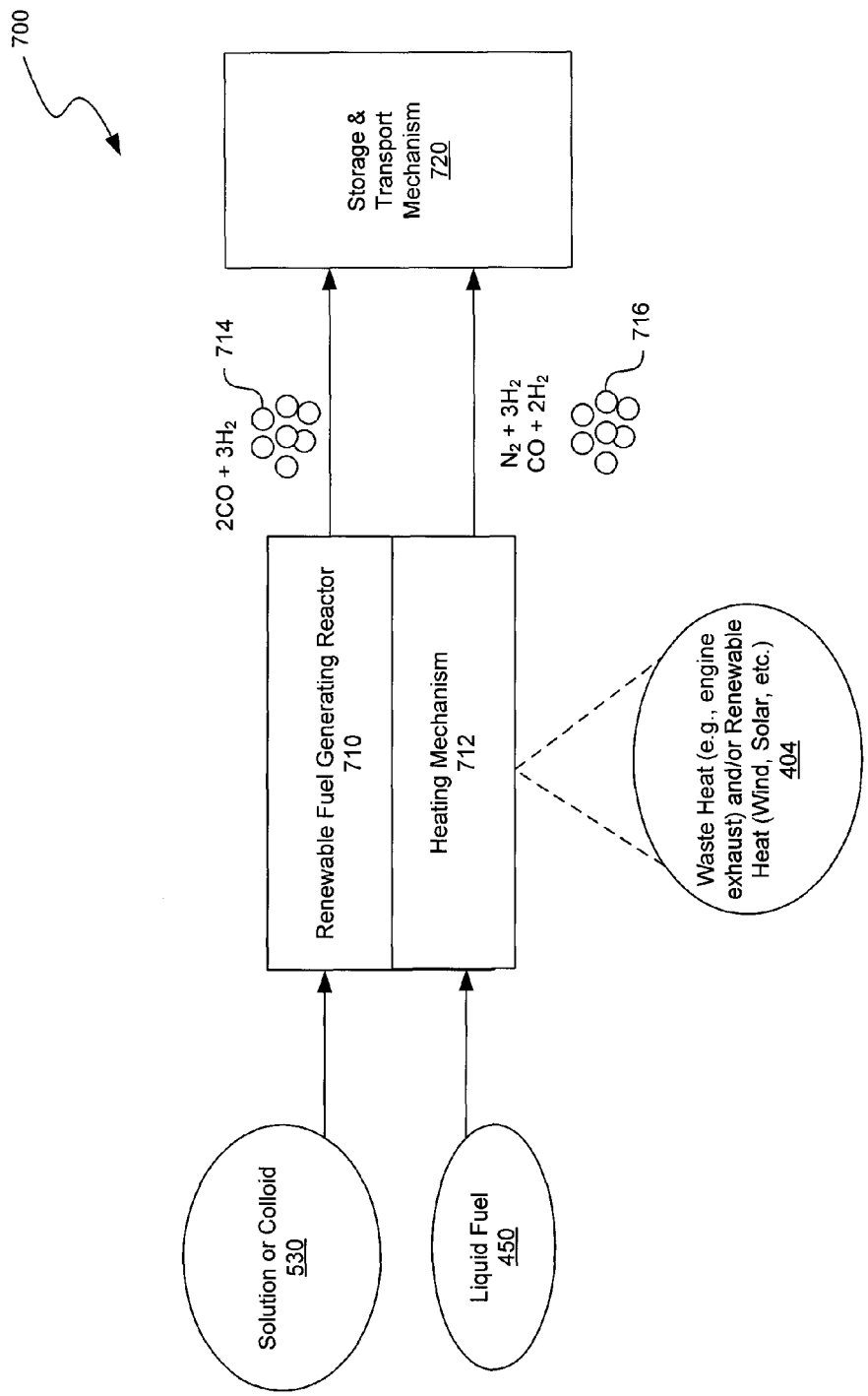
FIG. 7 is a block diagram showing an exemplary system for generating a multi-purpose liquid fuel for isolating hazardous contaminants and for storing energy as described above.

FIG. 7 is a block diagram showing an exemplary system 700 for generating multi-purpose liquid fuel for isolating hazardous contaminants and storing energy as described above. The system 700 includes a renewable fuel generating reactor 710 that receives the liquid fuel 450 generated as described above. The reactor 710 can also receive the solution or colloid 530 that isolated the hazardous contaminants. The reactor 710 can include a heating mechanism 712 to apply the amount of heat necessary to covert the liquid fuel 450 and the solution or colloid 530 that isolated the hazardous contaminants into gaseous fuel, e.g., gaseous renewable fuel. For example, the liquid fuel 450 can be dissociated to generate $N_2$, $H_2$, CO, or a combination (716). The solution or colloid 530 can also be dissociated to generate CO and $H_2$ (714). The heat used in the reaction can be obtained from waste heat 404 from engine exhaust or a cooling system that otherwise would be released to the environment. Also, heat from one or more renewable resources, such as wind, solar, running water, geothermal, etc., can be used in the reaction. The generated fuels 714 and 716 can be stored and or transported using a storage and transport mechanism 720, such as a pressurized container and/or pipelines.

Architectural Constructs as Sources of Hydrogen and Colloidal Carbon

Architectural constructs can be used to enhance the generation of liquid fuel for isolating contaminants or storing energy. Architectural constructs can be engineered to exhibit useful properties, such as the ability to be preloaded with hydrogen in various forms and colloidal carbon. An architectural construct can include a synthetic matrix of various elementary unit cells including crystals. The matrix of crystals can include various materials, such as graphene, graphite, boron nitride, or another material. Also, the hydrogen and/or colloidal carbon-preloaded architectural constructs can be implemented as a solid mass, as layers that are as thin as an atom, or in other arrangements and variations.

By preloading the architectural constructs with hydrogen or other materials and/or colloidal carbon, the above described processes for generating the liquid fuel can be enhanced or accelerated. Enhancing the generation of the liquid fuel similarly enhances or improves the use of the liquid fuel as a solvent or continuous phase that can be combined with harmful contaminants. In addition, the liquid fuel can be dissociated to produce gaseous fuel with a higher ratio of hydrogen to carbon than the liquid fuel.

As described herein, carbon and hydrogen (e.g., from biomass waste and pollutants) can be recycled and reused to generate a multipurpose liquid fuel that can be used as a solvent or continuous phase to isolate harmful contaminants and to store energy. The harmful contaminants not only can be isolated from the environment, but also can provide an additional source of energy and/or material in further processing. Using the techniques and system described above, the release of carbon and other harmful contaminants can be reduced and fuel can be generated. Several examples of architectural constructs are shown in U.S. application Ser. No. 13/027,214, filed Feb. 14, 2011.

Waste Material Isolation and/or Utilization Process

In several embodiments of a process according to the present technology, a liquid fuel (e.g., a liquid fuel at standard temperature and pressure) is used as a carrier for a waste material. In this way, for example, the waste material can be isolated from the environment for storage and/or transport prior to further processing. Examples of suitable liquid fuels include alcohols (e.g., methanol, ethanol, propanol, and butanol), alkynes (e.g., acetylene), ketones (e.g., acetone), ethers (e.g., dimethyl ether), and ammonia. In some embodiments of the present technology, the liquid fuel includes substantially no hydrocarbons or less than about 25% hydrocarbons. The liquid fuel can be provided or formed. The liquid fuel can be formed, for example, by reacting a gaseous fuel with air or a gaseous waste material. Examples of gaseous fuels include hydrogen, methane, ethane, butane, propane, carbon monoxide, nitrous oxide, syngas, natural gas, biogas, and other fuel gases alone or in combination with one or more other materials. In embodiments in which the liquid fuel is formed from a gaseous fuel, the gaseous fuel can be formed or provided. The gaseous fuel can be provided, for example, by removal from storage or extraction from a natural source. Hydrogen in gaseous fuel can be formed, for example, by re-forming hydrocarbons (e.g., methane) or by the electrolysis of water. Hydrogen and/or methane can be formed from a biomass according to one of the processes described above. Raw material for generating the gaseous fuel can be gas (e.g., natural gas), liquid (e.g., liquid biomass), or solid (e.g., solid biomass). The gaseous waste material to be reacted with the gaseous fuel to form the liquid fuel can be any gaseous byproduct material from a process that, according to standard practices, is disposed of or released into the environment.

Carbon dioxide is a common example of a gaseous waste material with regard to many industrial processes. In one example, hydrogen is reacted with carbon dioxide to form an alcohol (e.g., methanol, according to Equation 11). In another example, hydrogen is reacted with nitrogen (e.g., from air) to form ammonia, such as by the Haber process.

The liquid fuel can be combined with a waste material to form a solution or colloid. The waste material can be any byproduct of a process that, according to standard practices for the process, is disposed of or released into the environment. The waste material can include organic and/or inorganic materials and can include solid (e.g., solid at standard temperature and pressure), liquid (e.g., liquid at standard temperature and pressure), and/or gas (e.g., gas at standard temperature and pressure) materials. Examples of waste materials that can be combined with liquid fuel include volatile organic compounds (e.g., from the use and production of paints and polymers) and organic particulates (e.g., dust from coal and grain processing).

A variety of processes can be used to combine the waste material and the liquid fuel. Gaseous waste materials, for example, can be adsorbed from a waste stream and then desorbed into the liquid fuel using a pressure or temperature swing adsorption process. The adsorbent in such a process can include, for example, activated carbon or a zeolite. In several embodiments of a process according to the present technology, the waste material first is passed through an adsorption bed at high pressure and/or low temperature to adsorb the waste material. The liquid fuel then is passed through the adsorption bed at low pressure and/or high temperature to desorb the waste material into the liquid fuel. Alternatively, the waste material can be directly incorporated into the liquid fuel. For example, particulates can be combined with the liquid fuel in a stir tank.

Prior to combining the waste material and the liquid fuel, a precursor waste material can be separated into two or more portions. For example, a precursor waste material can be separated into a first portion to be combined with the liquid fuel and a second portion to be separately remediated. In several embodiments of the present technology, the waste material is subjected to an adsorption process before it is combined with the liquid fuel in order to separate the waste material into a first portion and a second portion. The adsorption process can be carried out at a temperature and pressure that specifically allows for the adsorption of the first portion of the waste material over the second portion of the waste material. The adsorbed first portion of the waste material can then be desorbed into the liquid fuel as discussed above. Alternatively, the adsorption process can be carried out at a temperature and pressure that specifically allows for the adsorption of the second portion of the waste material over the first portion of the waste material. The remaining first portion of the waste material then can be adsorbed in a separate adsorption process prior to being desorbed into the liquid fuel. Depending on the materials to be separated, processes other than adsorption can be appropriate. For example, certain materials in the waste material can be separated by filtration, such as by nanofiltration.

The separated second portion of the waste material can be more toxic to humans than the first portion. For example, the separated second portion of the waste material can have a higher concentration of one or more toxic materials than the first portion. Examples of toxic materials that can be separated in the second portion include carcinogens (e.g., certain aromatic hydrocarbons) and halogens (e.g., chlorine gas). Separating toxic materials can be useful when it is difficult to prevent human exposure to further processing of the solution or colloid that is formed by combining the waste material and the liquid fuel. In several embodiments of the present technology, further processing of the solution or colloid is performed at a remote location and/or further processing of the solution or colloid substantially converts toxic material in the waste material into lower toxicity material. In such embodiments, separating toxic material from the waste material can be unnecessary.

The solution or colloid can be stored or transported after formation. For example, combining the liquid fuel and the waste material to form the solution or colloid can occur at a first location and further processing of the solution or colloid can occur at a second location. The locations can be general facility locations rather than locations of specific pieces of equipment. The distance between the first location and the second location can be, for example, between about 100 m and about 1,000 km, such as between about 200 m and about 500 km or between about 1 km and about 200 km. Several examples of methods and systems for storing and transporting liquid fuel are described in U.S. Application No. 61/523, 262, filed Aug. 12, 2011. In addition to forming the solution or colloid at the first location, the liquid fuel can be formed at the first location. The waste material also can be separated into two or more portions at the first location. In several embodiments of the present technology, the first location is the location of an industrial process from which the waste material is harvested. The industrial process also can act as the source of the gaseous waste material for forming the liquid fuel. The second location can be a fuel processing location where solutions or colloids from multiple locations are processed collectively.

Processing the solution or colloid can include reacting the solution or colloid to form a gaseous fuel. For example, the liquid fuel in the solution or colloid can react to form the gaseous fuel. In a particular example, methanol can be reacted to form hydrogen and carbon monoxide. In addition to forming gaseous fuel from the liquid fuel, the waste material in the solution or colloid can be used in a reaction to form a gaseous fuel, a precursor material to be used in other processes, a solid product, or a combination thereof. When the waste material is used in a reaction to form an organic solid product or precursor material that is substantially separated, the remaining product, either the solution or colloid, can have a lower ratio of carbon to hydrogen than the solution or colloid did originally. Several examples of reactions used to form solid products from waste materials are described in U.S. application Ser. No. 13/027,068, filed Feb. 14, 2011. Both converting a liquid fuel into a gaseous fuel and converting a waste material into a gaseous fuel, a precursor material, a solid product, or a combination thereof typically are endothermic reactions performed under similar processing conditions, such as substantially anaerobic conditions. It can be synergistic, therefore, to perform these processes together. Furthermore, the gaseous fuel formed from reacting the liquid fuel can then be a reactant for converting the waste material. For example, if the liquid fuel is methanol and the waste material is carbon dioxide, hydrogen, used to react with the methanol, can react with the carbon dioxide to convert the carbon dioxide into a solid product. Gaseous fuel from reacting the solution or colloid can be stored, transported, or used for energy generation (e.g., in a fuel cell). Many liquid fuels (e.g., methanol) and waste materials (e.g., carbon dioxide) can react to form carbon monoxide, which can be used as an industrial product, as a gaseous fuel, or as a precursor for the formation of aldehydes (e.g., formaldehyde), carboxylic acids (e.g., acetic acid), carbides, and other useful materials.

Waste Material Isolation and/or Utilization System

Figure 8:
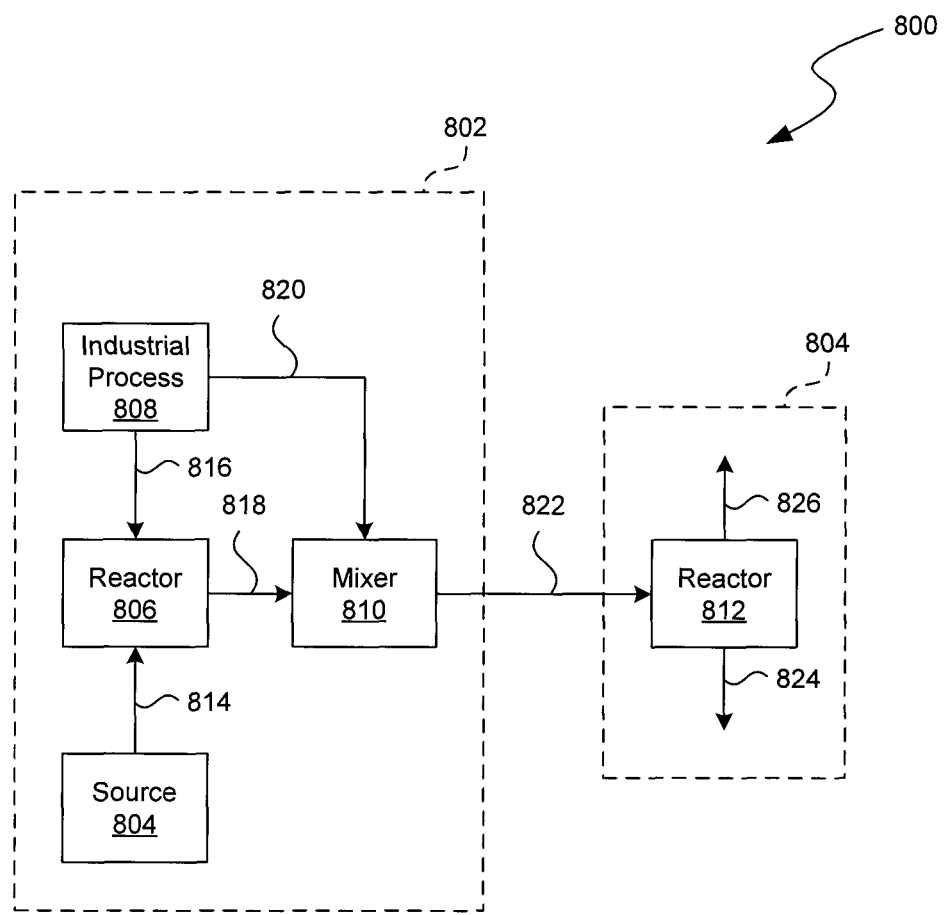
FIG. 8 is a block diagram of a system according to another embodiment of the present technology.

FIG. 8 illustrates a system 800 configured to isolate a waste material and/or utilize the waste material, such as to form a gaseous fuel and/or a solid product, according to an embodiment of the present technology. The system 800 shown in FIG. 8 is described below relative to its features and the features of exemplary processes for which the system and portions of the system can be configured. As shown in FIG. 8, the system 800 includes a first location 802 and a second location 804. The first location 802 includes a source 804, a reactor 806, an industrial process 808, and a mixer 810. The second location includes a reactor 812. The reactor 806 is configured to receive gaseous fuel from the source 804 through a pipeline 814 and a gaseous first waste material from the industrial process 808 through a pipeline 816. The gaseous fuel and gaseous first waste material react together to form a liquid fuel, which is delivered to the mixer 810 through a pipeline 818. The mixer 810 also receives a second waste material from the industrial process 808 through a pipeline 820. Within the mixer 810, the liquid fuel and the second waste material are combined to form a solution or colloid. The solution or colloid is transported to the reactor 812 at the second location 804 through a pipeline 822. In other embodiments, the pipeline 822 can be eliminated and the solution or colloid can be transported to the reactor 812 at the second location 804 using an alternative transportation process, such as via tanker trucks. Within the reactor 812, the solution or colloid is reacted to form a gaseous and/or liquid fuel product, which exits the reactor through a pipeline 824 to a point-of-use or for further processing (not shown). Reaction of the solution or colloid also forms a solid product or a precursor material, which exits the reactor 812 through a pipeline 826 to a point-of-use or for further processing (not shown).

Figure 9:
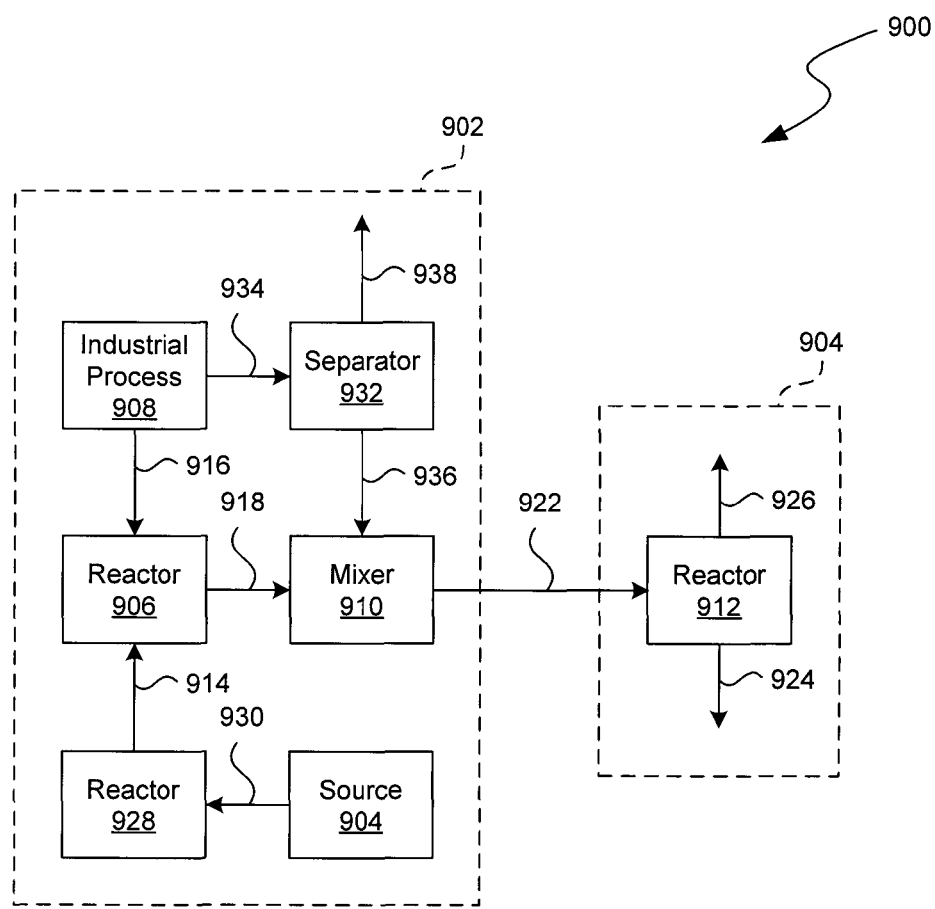
FIG. 9 is a block diagram of a system according to another embodiment of the present technology.

FIG. 9 illustrates a system 900 according to another embodiment of the present technology. The system 900 shown in FIG. 9 is described below relative to its features and the features of exemplary processes for which the system and portions of the system can be configured. The first digit of the reference numbers shown in FIG. 9 is "9." The final two digits of the reference numbers shown in FIG. 9 are identical to the final two digits of the reference numbers shown in FIG. 8 for similar or identical elements. Unlike the system 800 shown in FIG. 8, the system 900 shown in FIG. 9 includes a reactor 928 between the source 904 and the reactor 906. The reactor 928 receives raw material from the source 904 through a pipeline 930 and reacts the raw material to form gaseous fuel, which is transported to the reactor 906 through the pipeline 914. The reactor 928 can be configured, for example, to react the biomass from the source 904 to form gaseous fuel. Also, unlike the system 800 shown in FIG. 8, the system 900 shown in FIG. 9 includes a separator 932 between the industrial process 908 and the mixer 910. The separator 932 can be configured to receive the second waste material from the industrial process 908 through a pipeline 934. The second waste material can be separated into a first portion, which is routed to the mixer 910 through a pipeline 936, and a second portion, which is routed to storage or transport (not shown) through a pipeline 938. Within the mixer 910, the liquid fuel from the reactor 906 is combined with the first portion of the second waste material from the separator 932 to form the solution or colloid.

Systems according to embodiments of the present technology can have many variations relative to the systems 800, 900 shown in FIGS. 8 and 9. The systems can be configured for continuous and/or batch operation. Storage structures can be added at any point before, after, or along the pipelines. The reactors also can include two or more stages. For example, the separator 932 shown in FIG. 9 can include two or more separation stages, such as two or more adsorption stages. The mixers 810, 910 also can include adsorption stages. For example, the mixers 810, 910 can include adsorption stages configured to adsorb the gaseous first waste material or a portion of the gaseous first waste material and to desorb the adsorbed material into the liquid fuel. Adsorption stages in the separator 938 and/or the mixer 910 can include piping for purge streams as necessary.

With regard to a specific example, ammonia is a problematic waste. Manufacturers in the chemical industry are now required by law to reduce or eliminate their ammonia gas emissions, typically using ammonia scrubbers or other solutions at significant additional manufacturing cost. According to aspects disclosed herein, an alternative is to store hydrogen densely to form compounds such as alcohols from waste CO or CO2 or nitrogenous compounds such as NH3. NH3 will mix with water to form NH3OH which will allow carbon rich wastes to be incorporated as solutes. Waste heat can then be used and/or supplemented with renewable energy in endothermic reactions to produce carbon monoxide and hydrogen. For example:

$$2NH_3 + H_2O + C + HEAT \rightarrow CO + N_2 + 4H_2 \quad (22)$$

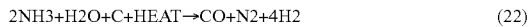

Further illustrations of disposing wastes including human and animal wastes such as urea and ammonia from similar and other sources, a number of values may be produced including more easily stored and transported guanidine. According to aspects disclosed herein, guanidine may be used to store soluble carbon wastes such as offgrade or contaminated starch, sugar, or molasses (CxYz) for purposes of producing greater amounts of hydrogen from such solid host substances. For example:

$$N_3H_5 + C_xH_z + xH_2O + HEAT \rightarrow xCO + (5+z/2+x) H_2 \quad (23)$$

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

U.S. application Ser. No. 13/027,196, filed Feb. 14, 2011 includes additional disclosure concerning carbon recycling. Processes, devices, and materials disclosed in U.S. application Ser. No. 13/027,068; U.S. Application No. 61/523,262;

and U.S. application Ser. No. 13/027,196 can be useful in implementing several embodiments of the present technology. To the extent the disclosure in U.S. application Ser. No. 13/027,068; U.S. Application No. 61/523,262; and U.S. application Ser. No. 13/027,196 conflicts with the disclosure presented herein, the present disclosure controls.

What is claimed is:

1. A method comprising:
    transporting a liquid fuel and a contaminant to a contaminant isolation system at a first location;
    adsorbing a waste material onto an adsorbent, wherein the contaminant is the adsorbed waste material;
    combining the liquid fuel and the contaminant to form a solution or colloid within the contaminant isolation system, wherein combining the liquid fuel with the contaminant includes desorbing the adsorbed waste material from the adsorbent into the liquid fuel;
    transporting the solution or colloid to a second location; and
    reacting the solution or colloid to form a gaseous fuel at the second location.

2. The method of claim 1, wherein reacting the solution or colloid includes reacting the solution or colloid substantially anaerobically.

3. The method of claim 1, wherein the first location is between about 1 km and about 500 km from the second location.

4. The method of claim 1, wherein the gaseous fuel is a first gaseous fuel, reacting the solution or colloid includes reacting the liquid fuel in the solution or colloid to form the first gaseous fuel and reacting the contaminant in the solution or colloid to form a second gaseous fuel, a solid product, a precursor material, or a combination thereof.

5. A method, comprising:
    transporting a liquid fuel and a contaminant to a contaminant isolation system at a first location, wherein the liquid fuel includes ammonia;
    combining the liquid fuel and the contaminant to form a solution or colloid within the contaminant isolation system;
    transporting the solution or colloid to a second location;
    reacting the solution or colloid to form a gaseous fuel at the second location; and
    reacting the gaseous fuel with nitrogen to form the liquid fuel.

6. The method of claim 5, wherein the contaminant is a waste material which includes an organic material.

7. The method of claim 5, further comprising reacting biomass to form the gaseous fuel reacted with nitrogen.

8. A method, comprising:
    transporting a liquid fuel and a contaminant to a contaminant isolation system at a first location;
    combining the liquid fuel and the contaminant to form a solution or colloid within the contaminant isolation system;
    transporting the solution or colloid to a second location; and
    reacting the solution or colloid to form a first gaseous fuel at the second location, wherein—
        reacting the solution or colloid includes reacting the liquid fuel in the solution or colloid to form the first gaseous fuel and reacting the contaminant in the solution or colloid to form a second gaseous fuel, a solid product, a precursor material, or a combination thereof, and
        the first gaseous fuel is a reactant in reacting the contaminant in the solution or colloid to form the second gaseous fuel, the solid product, the precursor material, or the combination thereof.

9. The method of claim 8, further comprising substantially separating the solid product, the precursor material, or the combination thereof from the first gaseous fuel.

10. A method, comprising:
    transporting a liquid fuel and a second contaminant to a contaminant isolation system at a first location;
    combining the liquid fuel and the second contaminant to form a solution or colloid within the contaminant isolation system;
    transporting the solution or colloid to a second location;
    reacting the solution or colloid to form a gaseous fuel at the second location; and
    reacting the gaseous fuel with a gaseous first contaminant to form the liquid fuel.

11. The method of claim 10, wherein the gaseous first contaminant and the second contaminant are from the same industrial process.

12. The method of claim 10, further comprising reacting biomass to form the gaseous fuel reacted with the gaseous first contaminant.

13. The method of claim 10, wherein the gaseous first contaminant includes carbon dioxide, and the liquid fuel includes an alcohol.

14. The method of claim 10, further comprising separating a waste material into a first portion and a second portion, the second portion of the waste material being more toxic to humans than the first portion of the waste material, wherein combining the liquid fuel and the contaminant includes combining the liquid fuel and the first portion of the waste material.

15. The method of claim 14, wherein separating the waste material includes separating the waste material at the first location.

16. The method of claim 14, wherein the first portion of the waste material includes an organic material.

17. The method of claim 14, further comprising separately remediating the second portion of the waste material.

18. A method, comprising:
    transporting a liquid fuel and a second contaminant to a contaminant isolation system at a first location;
    separating a waste material into a first portion and a second portion, the second portion of the waste material being more toxic to humans than the first portion of the waste material;
    combining the liquid fuel and the second contaminant to form a solution or colloid within the contaminant isolation system, wherein combining the liquid fuel and the contaminant includes combining the liquid fuel and the first portion of the waste material;
    transporting the solution or colloid to a second location;
    reacting the solution or colloid to form a gaseous fuel at the second location; and
    reacting the gaseous fuel with a first contaminant to form the liquid fuel.

19. A method, comprising:
    transporting a liquid fuel and a contaminant to a contaminant isolation system at a first location;
    separating a waste material into a first portion and a second portion, the second portion of the waste material being more toxic to humans than the first portion of the waste material, wherein separating the waste material into the first portion and the second portion includes selectively adsorbing the first portion of the waste material onto an adsorbent;

combining the liquid fuel and the contaminant to form a solution or colloid within the contaminant isolation system, wherein combining the liquid fuel with the contaminant includes desorbing the first portion of the waste material from the adsorbent into the liquid fuel and combining the liquid fuel and the first portion of the waste material;

transporting the solution or colloid to a second location; and reacting the solution or colloid to form a gaseous fuel at the second location.

20. A method, comprising:

transporting a liquid fuel and a contaminant to a contaminant isolation system at a first location;

separating a waste material into a first portion and a second portion, the second portion of the waste material being more toxic to humans than the first portion of the waste material, wherein separating the waste material includes selectively adsorbing the second portion of the waste material onto a first adsorbent;

adsorbing the first portion of the waste material onto a second adsorbent;

combining the liquid fuel and the contaminant to form a solution or colloid within the contaminant isolation system, wherein combining the liquid fuel and the contaminant includes desorbing the first portion of the waste material from the second adsorbent into the liquid fuel and combining the liquid fuel and the first portion of the waste material;

transporting the solution or colloid to a second location; and reacting the solution or colloid to form a gaseous fuel at the second location.

21. A method, comprising:

adsorbing a contaminant onto an adsorbent;

desorbing the contaminant from the adsorbent into a liquid fuel to form a solution or colloid at a first location;

transporting the solution or colloid to a second location;

reacting the liquid fuel in the solution or colloid substantially anaerobically at the second location to form a gaseous fuel;

reacting the contaminant in the solution or colloid at the second location to form a solid product, a precursor material, or a combination thereof;

separating the solid product, the precursor material, or the combination thereof from the gaseous fuel at the second location, wherein the first location is between about 1 km and about 500 km from the second location.

22. The method of claim 21, wherein the gaseous fuel is a reactant in reacting the contaminant in the solution or colloid to form the solid product, the precursor material, or the combination thereof.

23. The method of claim 21, wherein the contaminant includes carbon dioxide and the liquid fuel includes an alcohol.

24. The method of claim 21, further comprising separating a waste material into a first portion and a second portion, the second portion of the waste material being more toxic to humans than the first portion of the waste material, wherein combining the liquid fuel and the contaminant includes combining the liquid fuel and the first portion of the waste material.

25. The method of claim 24, further comprising separately remediating the second portion of the waste material.

* * * * *